(12) United States Patent
Stumpf et al.

(10) Patent No.: US 12,025,453 B2
(45) Date of Patent: Jul. 2, 2024

(54) AUTONOMOUS VEHICLE AUGMENTED REALITY DISPLAY FOR DISPLAYING CONTEXTUAL INFORMATION

(71) Applicant: GM Cruise Holdings LLC, San Francisco, CA (US)

(72) Inventors: Katherine Mary Stumpf, San Francisco, CA (US); Andrew Acosta, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 15 days.

(21) Appl. No.: 17/842,366

(22) Filed: Jun. 16, 2022

(65) Prior Publication Data
US 2022/0307851 A1    Sep. 29, 2022

Related U.S. Application Data

(63) Continuation of application No. 16/722,189, filed on Dec. 20, 2019, now Pat. No. 11,391,584.

(51) Int. Cl.
| | |
|---|---|
| G01C 21/34 | (2006.01) |
| G01C 21/36 | (2006.01) |
| G06V 20/56 | (2022.01) |

(52) U.S. Cl.
CPC ..... *G01C 21/3476* (2013.01); *G01C 21/3682* (2013.01); *G06V 20/56* (2022.01)

(58) Field of Classification Search
CPC ............ G01C 21/3476; G01C 21/3682; G01C 21/3415; G01C 21/343; G01C 21/3679; G06V 20/56; G06V 20/20
See application file for complete search history.

(56) References Cited

U.S. PATENT DOCUMENTS

| | | | |
|---|---|---|---|
| 9,304,008 B2 * | 4/2016 | Poppen | G01C 21/3626 |
| 2014/0280060 A1 * | 9/2014 | Campbell | G06F 16/29 |
| | | | 707/722 |

* cited by examiner

*Primary Examiner* — Brian P Sweeney

(57) ABSTRACT

The present technology is effective to cause at least one processor to determine that a vehicle is within a threshold distance from a point of interest, determine details about the point of interest, and present the details about the point of interest. The vehicle may be characterized by having the ability to take any route to a destination requested by a passenger and to travel to the destination at any speed that is appropriate for road and traffic conditions. The details about the point of interest to present may be based upon a location and a speed of the vehicle.

20 Claims, 7 Drawing Sheets

AUTONOMOUS VEHICLE AUGMENTED REALITY DISPLAY FOR DISPLAYING CONTEXTUAL INFORMATION

CROSS-REFERENCE TO RELATED APPLICATIONS

This application is a continuation and claims the benefit of U.S. application Ser. No. 16/722,189, filed on Dec. 20, 2019, entitled, AUTONOMOUS VEHICLE AUGMENTED REALITY DISPLAY FOR DISPLAYING CONTEXTUAL INFORMATION, which is expressly incorporated by reference herein in its entirety.

TECHNICAL FIELD

The present technology relates to presenting information to a passenger of an autonomous vehicle and more particularly to presenting contextual information about points of interest in an autonomous vehicle.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

As passengers ride in vehicles, the passengers may be unaware of various points of interests along their journey. Even when the passengers are aware of points of interests, they may not know that the point of interest may be visible or noticeable along the journey. Similarly, passengers who notice these points of interests may desire to learn more about these points of interests. While passengers may search and learn more about these points of interest by reading online or through books, it is cumbersome and difficult for passengers to directly find this information.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

In general, people in vehicles may observe various buildings and landmarks during their journey in the vehicles. Furthermore, the people may be unaware that the buildings and landmarks are points of interests (POIs) that may carry historical or cultural significance. Travelers and tourists in particular are unlikely to be aware of these POIs. Moreover, even people that are aware of the existence of these POIs may be unaware that their journey in the vehicles may bring them near or provide them with a sightline of the POI. While people that are aware of the POIs may search and plan a journey around various POIs, the result is a cumbersome and difficult experience for the people to find this information and plan a journey from POI to POI.

Furthermore, the people may desire to learn more information about these POIs. While people that are aware of the POIs may search for more information about these POIs, the result again is a cumbersome and disjointed experience. For example, a person may desire to learn more about a specific bridge but may not know the name of the bridge. Thus, the disclosed technology addresses the need in the art for a method for presenting contextualized information.

Figure 1:
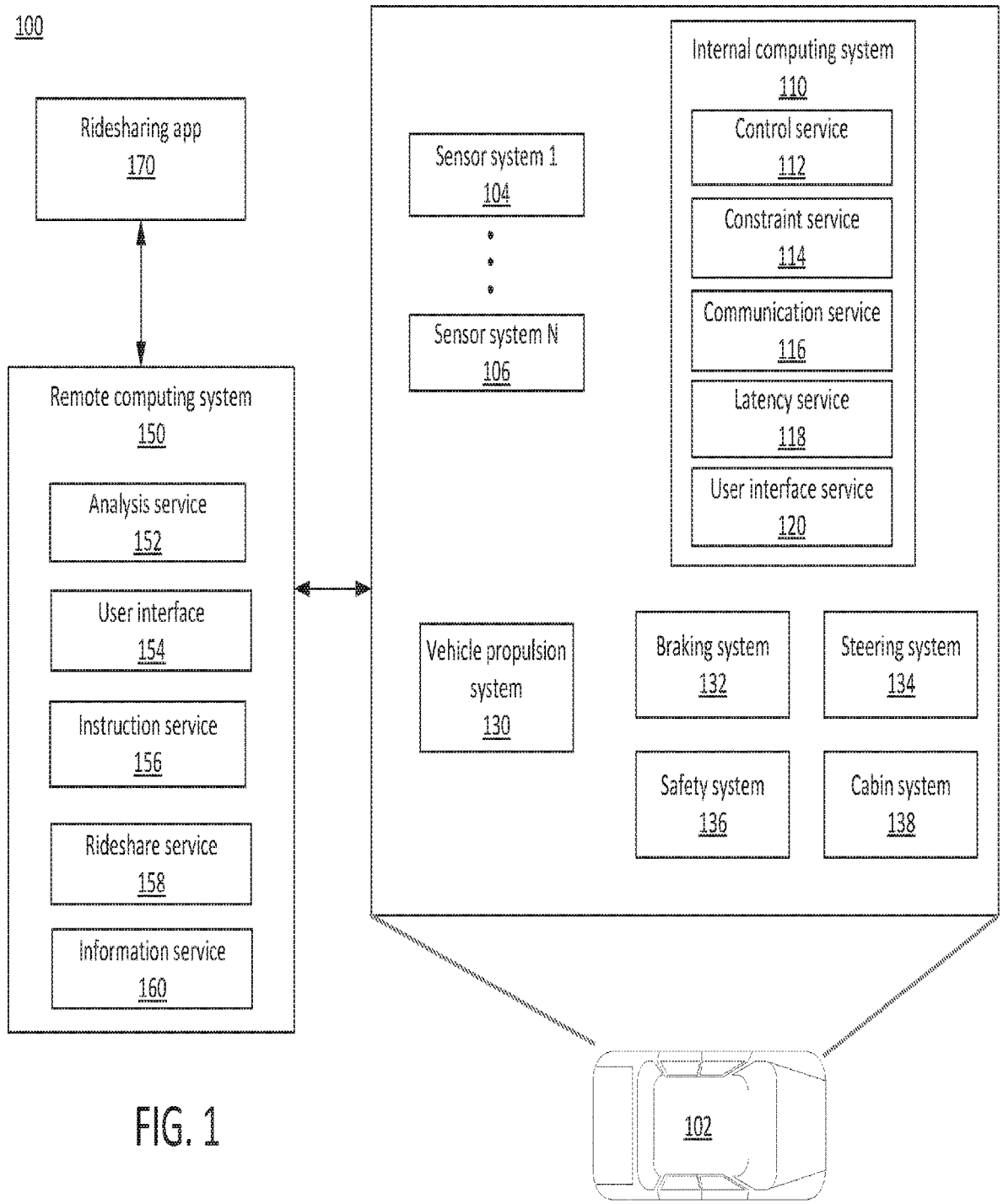
FIG. 1 shows an example of a content management system and client devices.

FIG. 1 illustrates environment 100 that includes an autonomous vehicle 102 in communication with a remote computing system 150.

The autonomous vehicle 102 can navigate about roadways without a human driver based upon sensor signals output by sensor systems 104-106 of the autonomous vehicle 102. More specifically, the autonomous vehicle may be characterized as having the ability to take any route to a destination requested by a passenger and to travel to the destination at any speed that is appropriate for road and traffic conditions. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system, and the Nth sensor system 106 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 104-106 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The internal computing system 110 can include a control service 112 that is configured to control the operation of the vehicle propulsion system 130, the braking system 132, the steering system 134, the safety system 136, and the cabin system 138. The control service 112 receives sensor signals from the sensor systems 104-106 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 114 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service 114 can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations. In some embodiments, the user interface service 120 may be a touch-screen display that the human passenger may interact with. In some embodiments, the user interface service 120 may communicate with the human passenger audibly.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include an information service 160 that may obtain, store, and communicate details about various points of interest. For example, the information service 160 may be a database that contains details about the various points of interest in a certain geographic area.

The remote computing system 150 can also include a rideshare service 158 configured to interact with ridesharing application 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 2A:
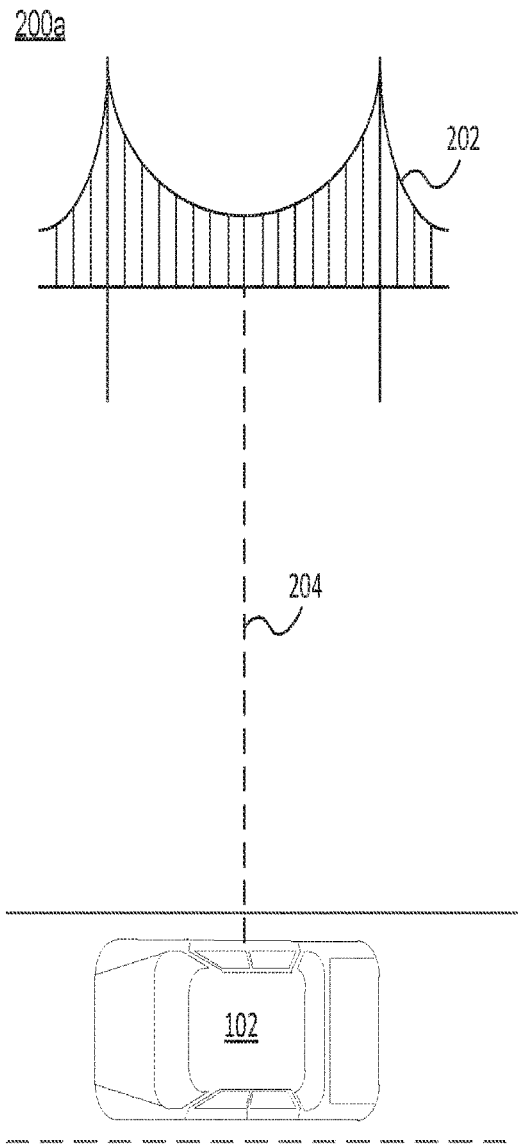
FIG. 2A shows an example environment of a vehicle passing by a point of interest.
Figure 2B:
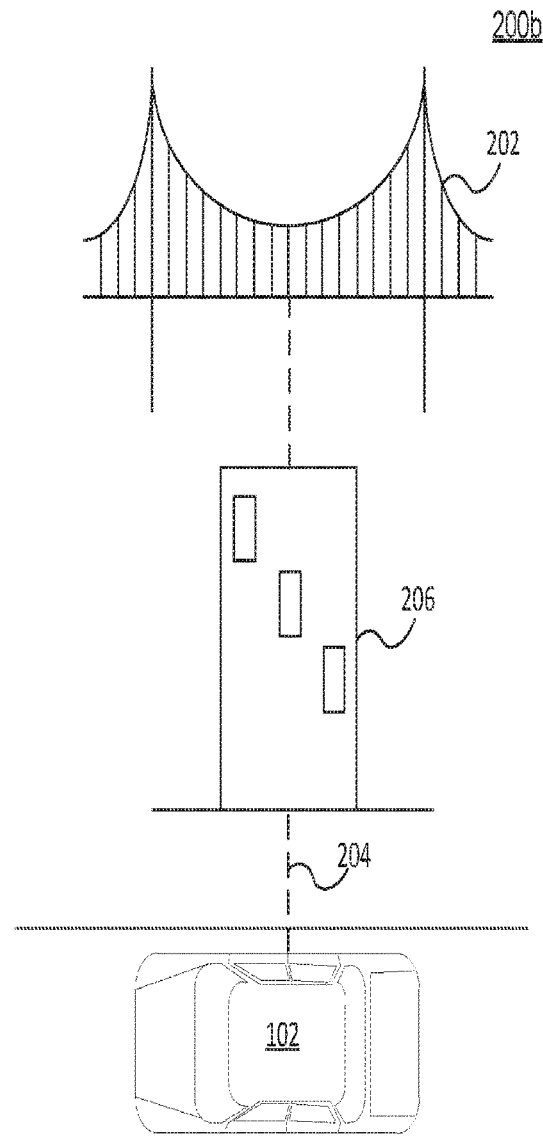
FIG. 2B shows another example environment of a vehicle passing by a point of interest.

FIGS. 2A-2B show example environments 200A, 200B of the autonomous vehicle 102 passing by a point of interest (POI) 202. In FIG. 2A, there is a potential sightline 204 from the autonomous vehicle 102 to the POI 202. Whereas, in FIG. 2B, the potential sightline 204 is blocked by an obstruction 206. The potential sightline 204 is a line of sight directly between the autonomous vehicle 102 and the POI 202, such that in optimal circumstances (e.g. good weather, no large trucks in between, etc.), there is no obstruction 206 between the autonomous vehicle 102 and the POI 202. In other words, the potential sightline 204 considers typically static, unchanging information (i.e. obstructions 206). The obstruction 206 may be buildings, bridges, or any other physical structure that may obscure the POI 202.

Figure 3:
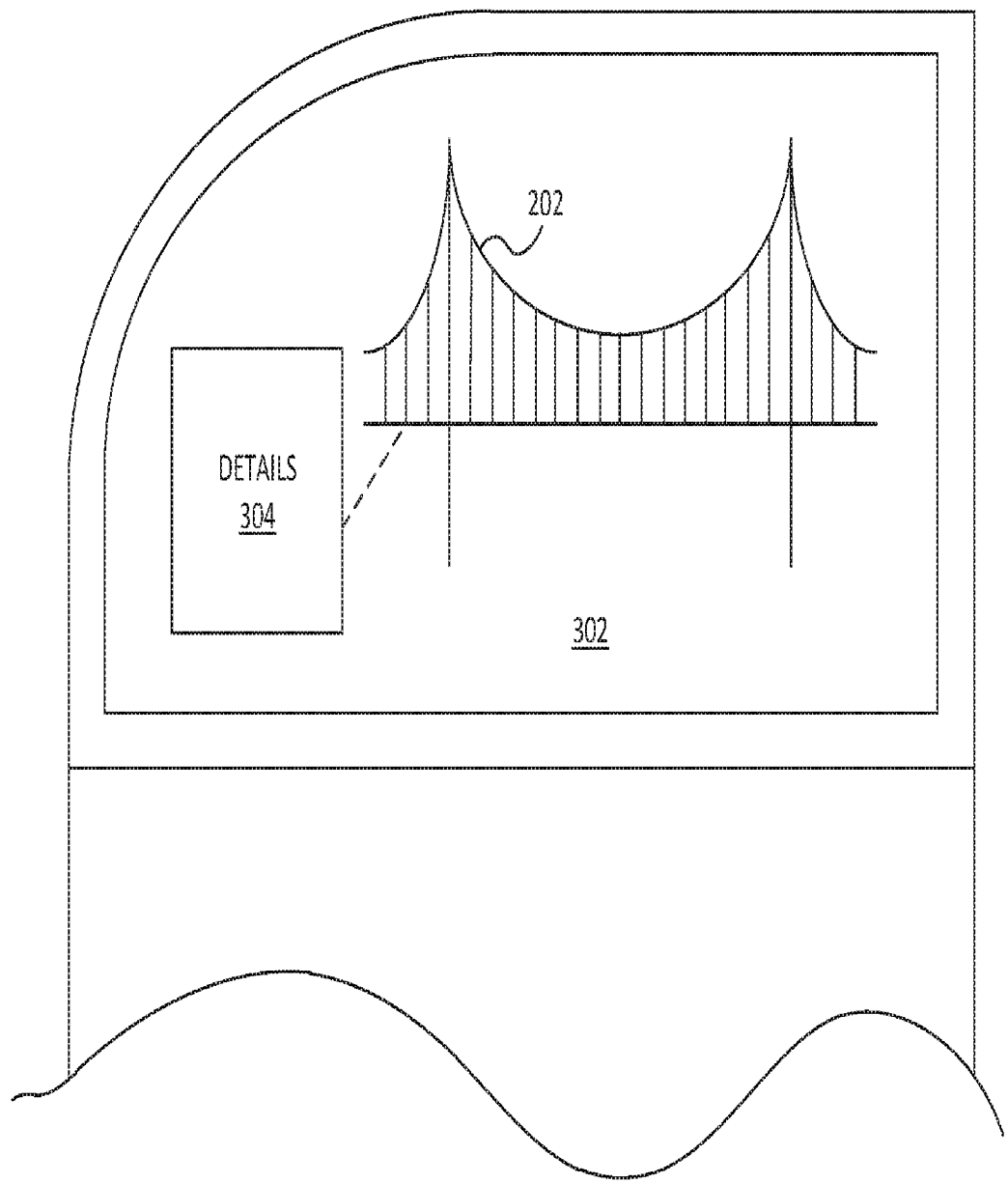
FIG. 3 shows an example of a display for implementing certain aspects of the present technology.

FIG. 3 shows an example 300 of a display 302 of the autonomous vehicle 102. The display 302 may be a window of the autonomous vehicle 102. In some embodiments, the display 302 may be projected into or onto the window of the autonomous vehicle 102. It is further contemplated that display 302 may be include some density of liquid-crystal displays (LCD) panels in the window of the autonomous vehicle 102.

The display 302 may present details 304 about the POI 202. More specifically, the display 302 may overlay an augmented reality layer having the details 304 about the POI 202. In other words, the display 302 superimposes an image onto the window, such that a user may see the image on the window and the real world therethrough. Similarly, the display 302 may highlight, circle, or otherwise distinguish POIs 202. Thus, the display 302 will present contextualized information about visible POIs 202. It is further contemplated that the display 302 may simply point towards or notify a passenger of the autonomous vehicle 102 that a POI 202 that is visible.

Figure 4:
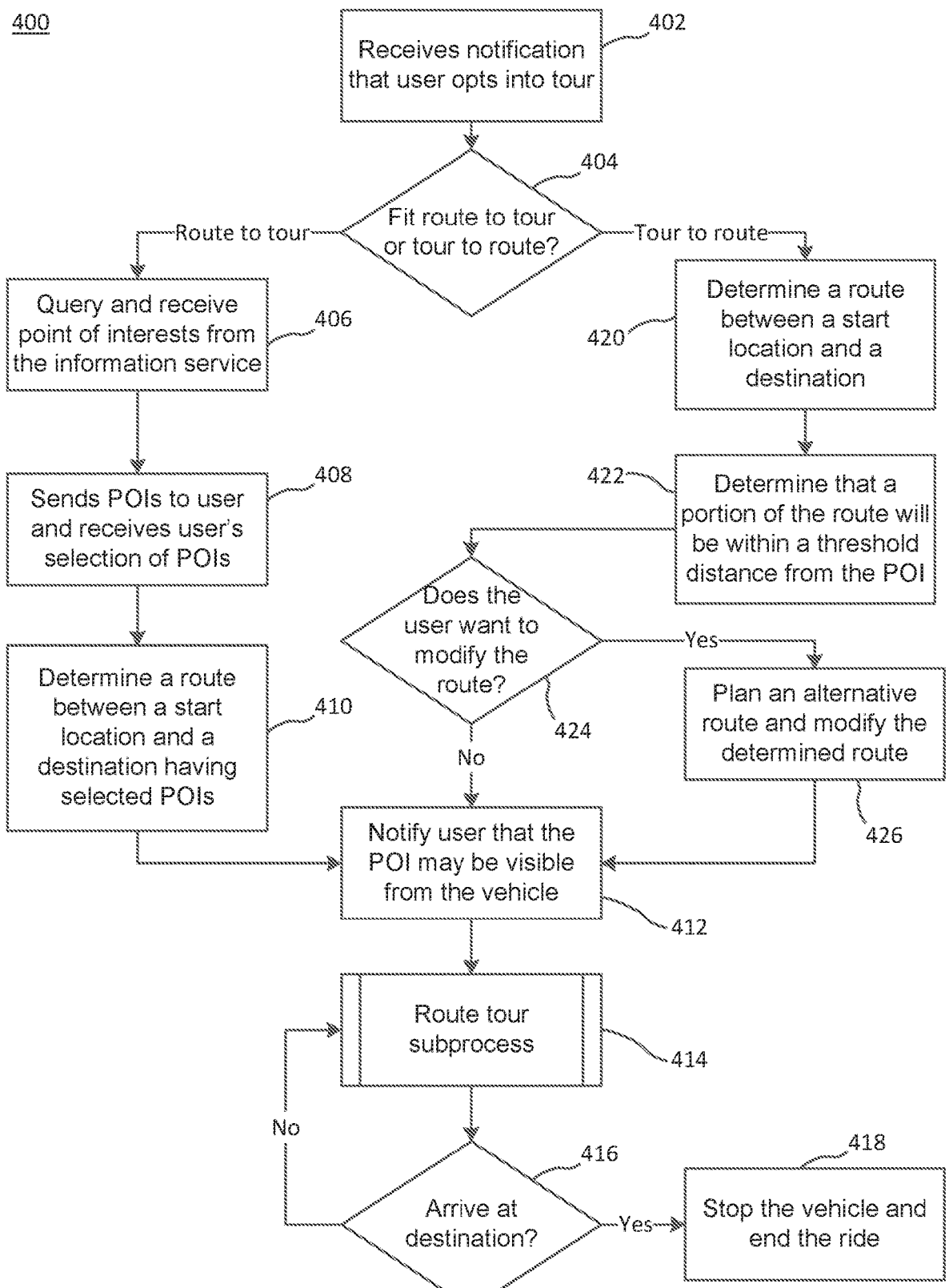
FIG. 4 is a flow diagram that illustrates an example process for providing contextualized information to a passenger of a vehicle.

FIG. 4 is a flow diagram that illustrates an example process 400 for providing contextualized information to a passenger of a vehicle. While this process 400 may be implemented by various systems (e.g. the internal computing system 110 and the remote computing system 150), this disclosure implements the process 400 through the internal computing system 110 for clarity and discussion purposes.

The process 400 begins when the internal computing system 110 receives 402 notice that a user or passenger has opted into a tour in the autonomous vehicle 102. In some embodiments, the autonomous vehicle 102 may prompt or ask whether the user would like to join the tour in the autonomous vehicle 102. In some embodiments, the user may set a preference in a user profile to join tours during rides in autonomous vehicles 102. In some embodiments, the user may specifically request tours in autonomous vehicles 102 through a mobile device or the user interface service 120. Furthermore, the internal computing system 110 may also receive a start location and a destination for a journey by the user.

The internal computing system 110 then determines 404 whether to fit a route to the tour or the tour to the route. In other words, the internal computing system 110 is determining whether the user would prefer to have a route tailored to various POIs (i.e. fitting a route to the tour) or to create a route and find various POIs along the route (i.e. fitting the tour to the route). The internal computing system 110 may determine 404 this by prompting or asking the user for their preference through the user interface service 120 or by communicating with the mobile device of the user. In some embodiments, the user may have set a preference in the user profile, such that the internal computing system 110 may simply determine the preference by checking the user profile.

If the internal computing system 110 determines 404 that the user would like to fit the route to the tour, then the internal computing system 110 queries and receives 406 POIs 202 from the information service 160. As discussed above, the information service 160 may contain details and information about POIs 202 around a related geographic area. Thus, the internal computing system 110 may query or communicate 406 with the information service 160 to receive 406 relevant POIs 202. Relevant POIs 202 may include POIs that are within a threshold distance between the start location and the destination, POIs that are considered by local residents to be significant or important, etc.

The internal computing system 110 then sends 408 the relevant POIs 202 to the user and receives 408 the user's selection of POIs. The user's selection of POIs is a list of POIs 202 that the user would like to see or have a sightline of. In some embodiments, the user's selection of POIs may be a list of POIs that the user would like to receive information about.

The internal computing system 110 then determines 410 a route between the start location and the destination. The determined route will have portions that have potential sightlines 204 between the autonomous vehicle 102 and all of the selected POIs 202. In other words, the determined route may allow the user to see the selected POIs 202. Thus, the internal computing system 110 determines a route between the start location and the destination, wherein the route is determined by locations of the selected POIs 202.

The internal computing system 110 then notifies 412, prior to the POI 202 being visible from the autonomous vehicle 102, the user of the autonomous vehicle 102 that the POI 202 will be visible from the autonomous vehicle 102 during the determined route. In some embodiments, the internal computing system 110 may notify 412 the user each time prior to a selected POI 202 being visible from the autonomous vehicle 102. More specifically, the internal computing system 110 may communicate with the user interface service 120 to notify the user that a selected POI 202 may soon be visible from the autonomous vehicle 102.

The internal computing system 110 then implements a route tour sub-process 414 that will be discussed in further detail below.

The internal computing system 110 then determines 416 whether the autonomous vehicle 102 has arrived at the destination. As discussed briefly above, in some embodiments, the internal computing system 110 may be in communication with the remote computing system 150 to determine, in combination with the remote computing system 150, whether the autonomous vehicle 102 has arrived at the destination.

If the internal computing system 110 determines 416 that the autonomous vehicle 102 has not arrived at the destination, then the internal computing system 110 continues implementing the route tour sub-process 414.

If the internal computing system 110 determines 416 that the autonomous vehicle has arrived at the destination, then the internal computing system 110 stops the autonomous vehicle 102 at the destination and ends the determined route.

Referring back to the internal computing system 110 determining 404 whether the user prefers to fit the route to the tour or the tour to the route, if the internal computing system 110 determines 404 that the user prefers to fit the tour to the route, then the internal computing system 110 determines 420 a route between the start location and the destination.

In some embodiments, the internal computing system 110 optionally determines 422 that a portion of the determined route will be within a threshold distance from a POI 202 and that a potential sightline 204 from the autonomous vehicle 102 to the POI 202 does not exist on the determined route. In some embodiments, the internal computing system 110 may determine 422 that a POI 202 may be within a threshold distance from a portion of the determined route. Similarly, in some embodiments, the threshold distance may instead be a threshold amount of time, such that a deviation from the determined route may take a deviation amount of time and the internal computing system 110 may determine 422 that the deviation amount of time is less than the threshold amount of time. In other words, the internal computing system 110 is determining 422 that a POI 202 may merit a detour based on a threshold distance or threshold amount of time.

The internal computing system 110 then determines 424 whether the user wants to modify the determined route with the POI 202 that may merit a detour. The internal computing system 110 may prompt the user with an option to modify the determined route to having a potential sightline from the autonomous vehicle 102 to the POI 202 that may merit a detour. For example, the user may send an authorization to modify the determined route and the internal computing system 110 may receive the authorization from the user.

If the internal computing system 110 determines 424 that the user would not like to modify the determined route, the internal computing system 110 maintains the determined route and proceeds directly to notifying 412 the user about POIs 202 that will be visible from the autonomous vehicle 102.

If the internal computing system 110 determines 424 that the user would like to modify the determined route, then the internal computing system 110 plans 426 an alternative route and modifies 426 the determined route with the alternative route, such that the alternative route becomes the determined route. Thus, in some embodiments, the internal computing system 110, after receiving the authorization from the user, may plan the alternative route to have the potential sightline 204 to the POI 202.

Then the internal computing system 110 notifies 412 the user that the POIs 202 may be visible from the autonomous vehicle 102.

It is contemplated that, in some embodiments, the internal computing system 110 may, after determining 420 the determine route, the internal computing system 110 directly notifies 412, prior to the POI 202 being visible from the autonomous vehicle 102, the user of the autonomous vehicle 102 that the POI 202 will be visible from the autonomous vehicle 102 during the determined route. Thus, in these embodiments, the determinations 422, 424, the planning of the alternate route, and the modification 426 of the determine route are optional.

As discussed above, the internal computing system 110 then proceeds to implement the route tour sub-process 414, as described in further detail below.

Figure 5:
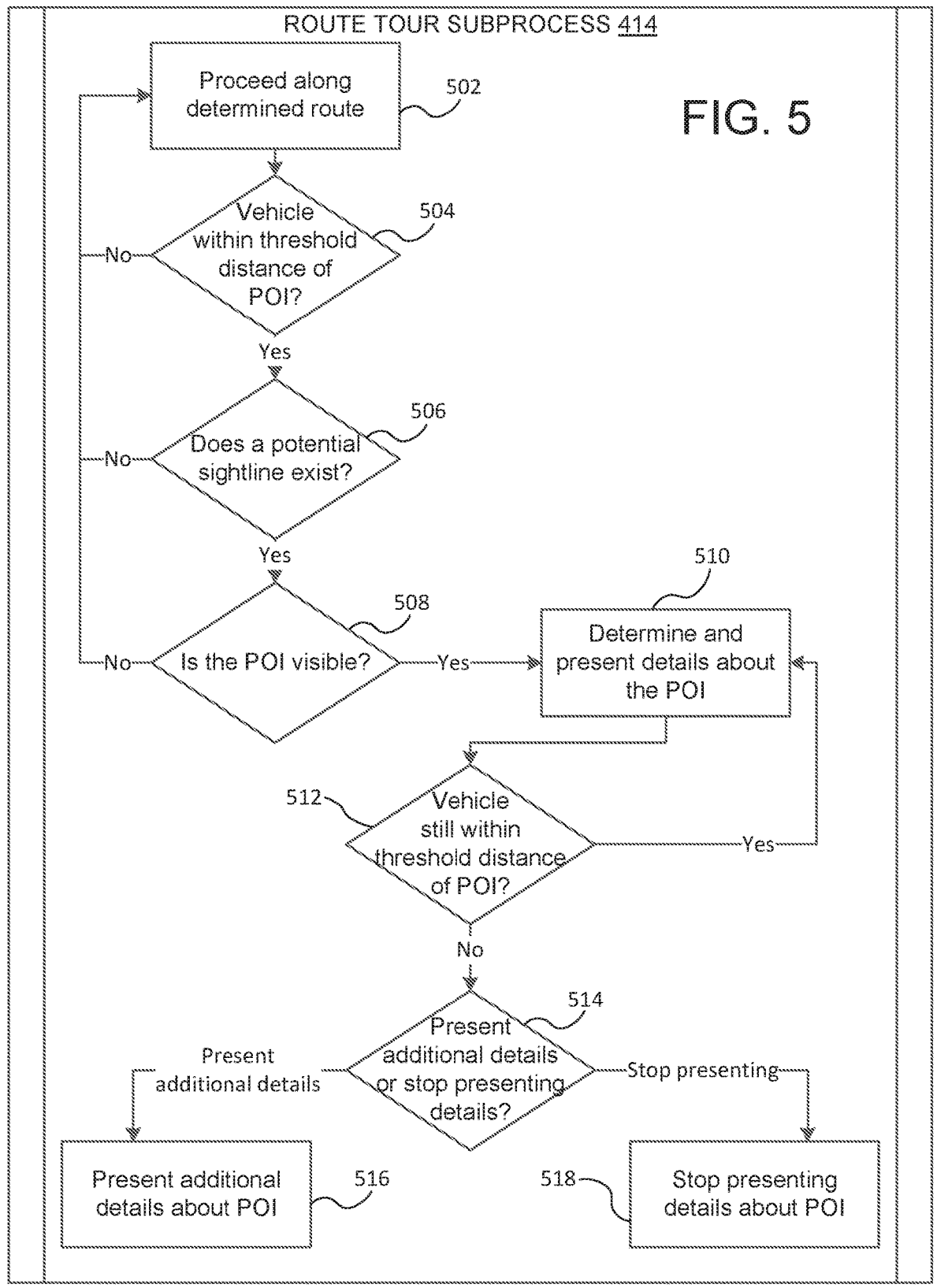
FIG. 5 is a flow diagram that illustrates an example subprocess for presenting the contextualized information to the passenger of the vehicle.

FIG. 5 is a flow diagram that illustrates an example of the route tour sub-process 414 for presenting the contextualized information to the passenger of the vehicle. While the route tour sub-process 414 may be implemented by various systems, this disclosure implements the route tour sub-process 414 through the internal computing system 110 for clarity and discussion purposes.

The route tour sub-process 414 begins as the internal computing system 110 directs and observes 502 the autonomous vehicle 102 as the autonomous vehicle 102 proceeds along the determined route.

The internal computing system 110 then determines 504 whether the autonomous vehicle is within a threshold distance of a POI 202.

If the internal computing system 110 determines 504 that the autonomous vehicle 102 is not within a threshold distance of the POI 202, then the internal computing system 110 returns to directing and observing 502 the autonomous vehicle 102.

If the internal computing system 110 determines 504 that the autonomous vehicle 102 is within a threshold distance of the POI 202, then the internal computing system 110 determines 506 whether a potential sightline 204 exists between the autonomous vehicle 102 and the POI 202. In some embodiments, the internal computing system 110 may communicate with the information service 160 to determine whether the potential sightline 204 exists. As discussed above, the information service 160 may contain information about various POIs 202. The information may include potential sightlines 204 between locations and the POIs 202. In some embodiments, the potential sightlines 204 may be considered information about the POI 202. In other embodiments, the potential sightlines 204 may be considered information about a tile that corresponds to the location from which the potential sightline to the POI 202 may exist. In some embodiments, the tile may be in a map database having high information density for each tile. It is further contemplated that a mapping car having additional exteroceptive sensor arrays may also map potential sightlines to the POIs 202 from specific coordinates that may correspond to the locations from which the potential sightline to the POIs 202 may exist. Thus, the autonomous vehicle would know whether a sightline from a particular coordinate exists by querying map data in the map database.

If the internal computing system 110 determines 506 that the potential sightline 204 does not exist, the internal computing system 110 returns to directing and observing 502 the autonomous vehicle 102.

If the internal computing system 110 determines 506 that the potential sightline 204 exists, the internal computing system 110 determines 508 if the POI 202 is visible from the autonomous vehicle 102. More specifically, the internal computing system 110 may communicate with the sensor systems 104-106 to detect that the POI 202 is visible from the autonomous vehicle 102. In other words, the internal computing system 110 may detect, using sensor systems 104-106 of the autonomous vehicle 102, that the POI 202 is or is not visible from the autonomous vehicle 102. For example, the internal computing system 110 may align cameras to view the POI 202.

If the internal computing system 110 determines 508 that the POI 202 is not visible from the autonomous vehicle 102, the internal computing system 110 returns to directing and observing the autonomous vehicle 102. In some embodiments, the internal computing system 110 may instead project an augmented reality layer or a visual overlay onto the display 302, such that the augmented reality layer or visual overlay includes an image of the POI 202 from a previous point in time projected onto a position of the POI 202 in the display 302, such that the image may replicate the experience of seeing the POI 202. For example, on a foggy day, the Golden Gate Bridge may be obscured; thus, the internal computing system 110 may direct the visual overlay on the display 302 to show an image of the Golden Gate Bridge from a previously sunny day. Therefore, the user will still be able to see the desired POI 202 despite the POI not being visible at that time.

If the internal computing system 110 determines 508 that the POI is visible from the autonomous vehicle 102, the internal computing system 110 determines and presents 510 details about the POI 202. More specifically, the internal computing system 110 determines 510 the details 304 about the POI 202 by communicating with the information service 160. Furthermore, the internal computing system 110 further determines 510 the details 304 about the POI 202 based upon the location and a speed of the autonomous vehicle 102. For example, a larger amount of detail 304 about the POI 202 may be determined and presented 510 because the autonomous vehicle 102 has just entered a location that has a sightline 204 of the POI 202, and is travelling relatively slow, such that there will be a long period of time to observe the POI 202. In some embodiments, the internal computing system 110 may adjust, when the autonomous vehicle 102 is within the threshold distance from the POI 202, the speed and an acceleration of the autonomous vehicle 102 to increase or adjust a period of time that the POI 202 is visible from the autonomous vehicle 102.

As addressed briefly above in FIG. 3, the display 302 may overlay an augmented reality layer or visual overlay onto the window of the autonomous vehicle 102, such that the POI 202 is visible through the window with details 304 in the augmented reality layer also visible. In some embodiments, the augmented reality layer or visual overlay may further include an image of the POI 202 from a previous point in time projected onto a position of the POI 202 in the display 302, such that the image may partially or fully obscure the POI 202. For example, the visual overlay may partially or fully project an image of the Golden Gate Bridge in 1920 onto the position of the Golden Gate Bridge in the display, so that the user may see how the Golden Gate Bridge has changed between the two time periods.

Positioning and alignment of the image may be determined by both a height and seating position of the user. In some embodiments, with user consent, the internal computing system 110 may utilize sensor systems 104-106 inside the cabin of the autonomous vehicle 102 to determine the height and seating position of the user. Similarly, in some embodiments, with user consent, the internal computing system 110 may utilize sensor systems 104-106 inside the cabin of the autonomous vehicle 102 to determine a direction and line of sight of a user's gaze to determine proper positioning and alignment of the visual overlay. Furthermore, in some embodiments, the internal computing system 110 may use pressure sensors in seats of the autonomous vehicle 102 to determine where the user is seated. Similarly, in some embodiments, the user may store their height in a user profile, so that the internal computing system 110 may be able to use this stored height information to determine proper positioning and alignment of the visual overlay.

In some embodiments, the internal computing system 110 may communicate with a mobile device accessible by the user or passenger of the autonomous vehicle 102. In these embodiments, the internal computing system 110 communicates with the mobile device to send additional details of the POI to the mobile device. In some embodiments, the internal computing system 110 communicates with the remote computing system 150, which then communicates with the mobile device to send the additional details to the mobile device. The additional details are then projected onto a screen of the mobile device. It is further contemplated that, in some embodiments, the mobile device may be a tablet embedded in the autonomous vehicle 102 for use by the user during the journey.

In some embodiments, the display may be a screen on a mobile device of the user or passenger. In these embodiments, the internal computing system 110 communicates with the mobile device to send mobile device instructions to the mobile device. In some embodiments, the internal computing system 110 communicates with the remote computing system 150, which then communicates with the mobile device to send the mobile device instructions to the mobile device. The mobile device instructions may be effective to cause the mobile device to receive information about the POI 202 that is visible from the vehicle. The information may have been determined from data detected by the sensor system 104-106 of the autonomous vehicle 102. In some embodiments, the mobile device instructions may then also direct the user or passenger to position the mobile device towards the POI 202, such that the visual overlay appears on the screen of the mobile device.

It is further contemplated that the details 304 about the POI 202 may also be presented audibly. In some embodiments, the above-mentioned technology may be incorporated with audibly presenting details 304 about the POI 202. For example, the internal computing system 110 may determine based on location and speed of the autonomous vehicle 102 the amount of detail 304 to audibly present about POI 202.

The internal computing system 110 then determines 512 whether the autonomous vehicle 102 is still within the threshold distance of the POI 202.

If the internal computing system 110 determines 512 that the autonomous vehicle 102 is still within the threshold distance from the POI 202, then the internal computing system 110 continues to present 510 details 304 about the POI 202.

If the internal computing system 110 determines 512 that the autonomous vehicle 102 is no longer within the threshold distance from the POI 202, then the internal computing system determines 514 whether to present additional details about the POI 202 or to stop presenting details 304 about the POI 202. In some embodiments, the internal computing system 110 may prompt the user via the user interface service 120 or the display 302 whether the user prefers to see additional details about the POI 202 or to clear the display 302. In some embodiments, the user may set a preference in the user profile so that the internal computing system 110 may simply check the user profile to determine the preference.

If the internal computing system 110 determines 514 that the user prefers to present additional details or information about the POI 202, then the internal computing system 110 presents 516 additional information about the POI 202. In some embodiments, the internal computing system 110 may again query the information service 160 to receive additional details about the POI 202. In some embodiments, the internal computing system 110 may have previously determined 510 all available details 304 about the POI 202 and presented 510 a subset of all available details 304 about the POI 202, such that the internal computing system 110 need not query the information service 160 again.

If the internal computing system 110 determines that the user prefers to stop presenting details 304 about the POI 202, then the internal computing system 110 stops 518 presenting details 304 about the POI 202 and clears 518 the display 302.

As discussed above in FIG. 4, the route tour sub-process 414 then ends and may be re-initiated for subsequent POIs 202 until the autonomous vehicle 102 arrives at the destination. It is further contemplated that the route tour sub-process 414 may be adapted to consider scenarios, in which a second POI 202 is visible prior to the autonomous vehicle 102 being outside of the threshold distance from the POI 202. The internal computing system 110 may then similarly present 510 details 304 about the second POI 202 in parallel with the details 304 of the POI 202. Similarly, the route tour sub-process 414 may be implemented concurrently with other instances of the route tour sub-process 414, the internal computing system 110 only determines 514 the user's preference when the autonomous vehicle 102 is no longer within the respective threshold distances of all selected POIs 202. In other words, the internal computing system 110 may determine that the location of the autonomous vehicle 102 is no longer within the threshold distance of the POI 202, then determine that the location of the autonomous vehicle 102 is not within a second threshold distance from a second POI 202, at which point the internal computing system 110 may prompt the user of the autonomous vehicle 102 for a preference to clear the display or to project additional details about any of the selected POIs 202.

Figure 6:
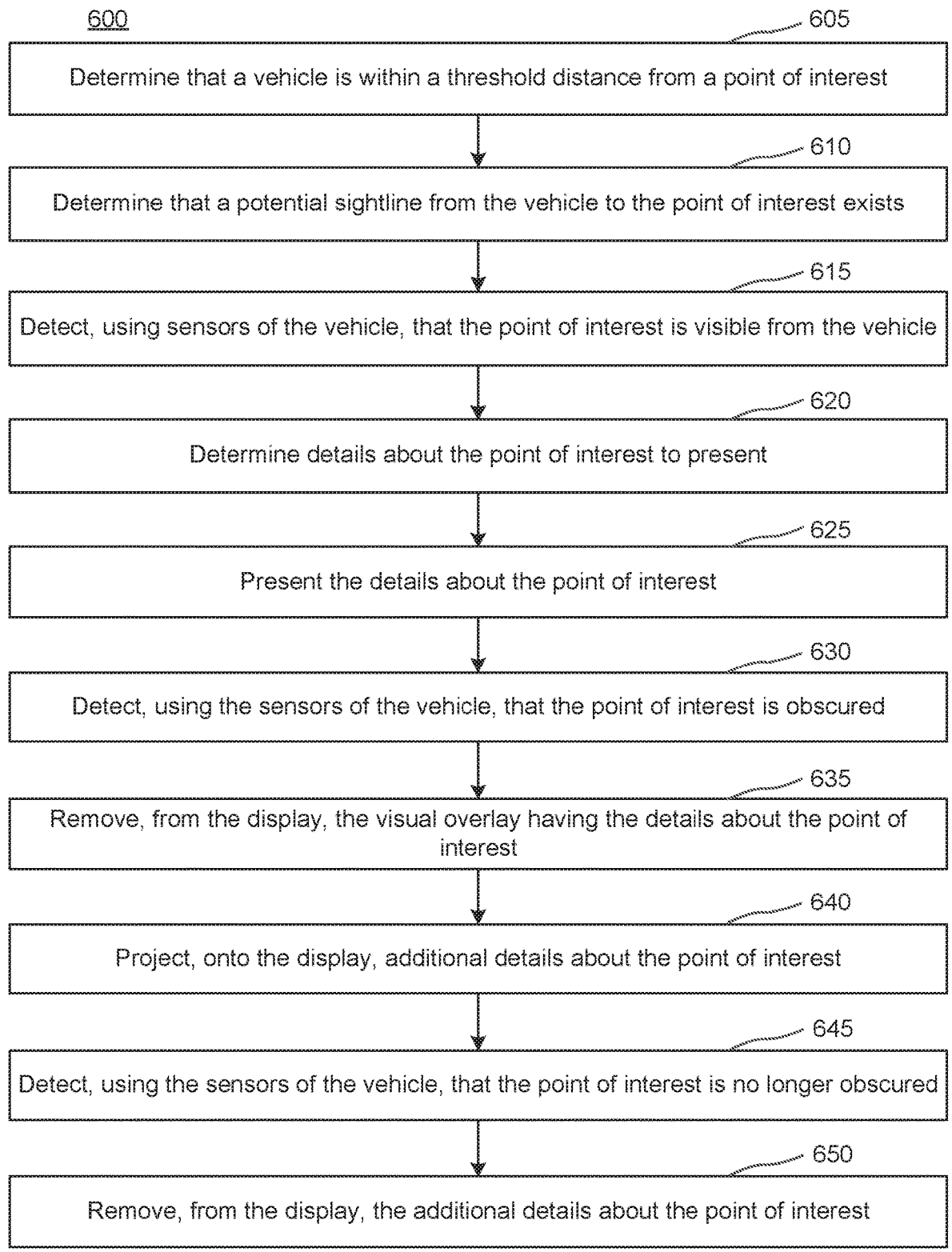
FIG. 6 is a flow diagram that illustrates an example method for displaying contextualized information to the passenger of the vehicle.

FIG. 6 is a flow diagram that illustrates an example process 600 for displaying contextualized information to the passenger of the vehicle. Like the above, process 600 may be implemented by various systems; however, in the interest of discussion and clarity purposes, the process 600 is described to be implemented by the internal computing system 110.

Process 600 begins when the internal computing system determines 605 that the autonomous vehicle 102 is within a threshold distance from a POI 202.

The internal computing system 110 may then determine 610 that a potential sightline from the autonomous vehicle to the POI 202 exists.

The internal computing system 110 may then detect 615, using the sensor system 104-106 of the autonomous vehicle 102, that the POI 202 is visible from the autonomous vehicle 102.

The internal computing system 110 may then determine 620 details about the POI 202 to present or display to the user.

The internal computing system 110 then presents or projects 625, onto the display 302, a visual overlay having the details about the POI 202 to the user.

The internal computing system 110 may then detect 630, using the sensor system 104-106 of the autonomous vehicle 102, that the POI 202 has been temporarily obscured by an object. For example, the autonomous vehicle 102 may be passing by a large tree or a large truck is now driving next to the autonomous vehicle 102.

The internal computing system 110 may then remove 635, from the display 302, the visual overlay having the details 304 about the POI 202. The removal 635 of the details 304 from the display 302 creates an immersive experience for the user, such that the details 304 remains highly contextualized. In other words, the visual overlay would adapt so that the user is certain that the details 304 are about the POI 202 that is no longer visible. In some embodiments, the visual overlay highlights, circles, or otherwise identifies the POI 202. In these embodiments, the internal computing system 110 may remove 635 only the highlights, circles, or other identifiers of the POI 202, while continuing to present 625 the details 304.

The internal computing system 110 may then present or project 640, onto the display 302, additional details about the POI 202. In some embodiments, the additional details may also note that the POI 202 is not currently visible.

The internal computing system 110 may then detect 645, using the sensor system 104-106 of the autonomous vehicle, that the POI 202 is no longer obscured.

Thus, the internal computing system 110 may then remove 650, from the display 302, the additional details about the POI 202. In some embodiments, the internal computing system 110 may project 625 the visual overlay to again highlight, circle, or otherwise identify the POI 202.

Figure 7:
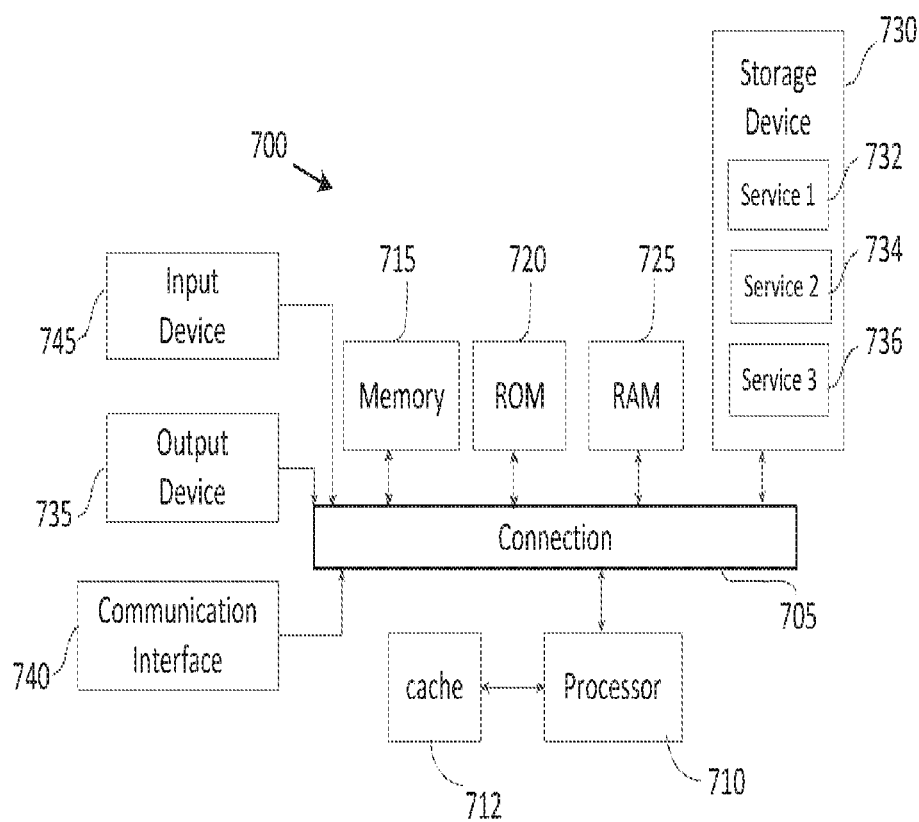
FIG. 7 shows an example of a system for implementing certain aspects of the present technology.

FIG. 7 shows an example of computing system 700, which can be for example any computing device making up internal computing system 110, remote computing system 150, (potential) passenger device executing rideshare app 170, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement, and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   modifying a determined route to generate a modified route that includes a detour to a point of interest;
   determining, based on sensor data received from one or more sensors of a vehicle, that the vehicle is within a threshold distance from the point of interest, wherein the sensor data indicates a position of the vehicle; and
   adjusting, when the vehicle is within the threshold distance from the point of interest, a speed and an acceleration of the vehicle to increase a period of time that the point of interest is visible.

2. The method of claim 1, further comprising:
   prior to modifying the determined route to generate the modified route, determining that a potential sightline exists along the modified route to the point of interest, wherein modifying the determined route to generate the modified route is based on the potential sightline.

3. The method of claim 1, further comprising:
   detecting, using the one or more sensors of the vehicle, that the point of interest is obscured;
   removing, from a display, details about the point of interest; and
   projecting, onto a position on the display where the point of interest would be if the point of interest were not obscured, a virtual representation of the point of interest.

4. The method of claim 3, further comprising:
   detecting, using the one or more sensors of the vehicle, that the point of interest is no longer obscured; and removing, from the display, the virtual representation of the point of interest.

5. The method of claim 3, wherein the virtual representation is an image of the point of interest from a previous point in time.

6. The method of claim 1, further comprising:
detecting, using the one or more sensors of the vehicle, a weather condition around the point of interest; and
projecting, onto a position on a display where the point of interest is, a visual overlay showing the point of interest in a different weather condition.

7. The method of claim 1, wherein the vehicle is dispatched by a ridesharing service.

8. The method of claim 1, further comprising:
determining details about the point of interest to present; and
presenting at least a portion of the details about the point of interest, wherein an amount of details included in the portion is based at least in part on a speed of the vehicle.

9. A non-transitory computer readable medium comprising instructions stored thereon, the instructions effective to cause at least one processor to:
modify a determined route to generate a modified route that includes a detour to a point of interest;
determine, based on sensor data received from one or more sensors of a vehicle, that the vehicle is within a threshold distance from the point of interest, wherein the sensor data indicates a position of the vehicle; and
adjust, when the vehicle is within the threshold distance from the point of interest, a speed and an acceleration of the vehicle to increase a period of time that the point of interest is visible.

10. The non-transitory computer readable medium of claim 9, wherein the instructions are further effective to cause the at least one processor to:
prior to modifying the determined route to generate the modified route, determining that a potential sightline exists along the modified route to the point of interest, wherein modifying the determined route to generate the modified route is based on the potential sightline.

11. The non-transitory computer readable medium of claim 9, wherein the instructions are further effective to cause the at least one processor to:
detect, using the one or more sensors of the vehicle, that the point of interest is obscured;
remove, from a display, details about the point of interest; and
project, onto a position on the display where the point of interest would be if the point of interest were not obscured, a virtual representation of the point of interest.

12. The non-transitory computer readable medium of claim 11, wherein the instructions are further effective to cause the at least one processor to:
detect, using the one or more sensors of the vehicle, that the point of interest is no longer obscured; and
remove, from the display, the virtual representation of the point of interest.

13. The non-transitory computer readable medium of claim 11, wherein the virtual representation is an image of the point of interest from a previous point in time.

14. The non-transitory computer readable medium of claim 9, wherein the instructions are further effective to cause the at least one processor to:
detect, using the one or more sensors of the vehicle, a weather condition around the point of interest; and
project, onto a position on a display where the point of interest is, a visual overlay showing the point of interest in a different weather condition.

15. The non-transitory computer readable medium of claim 9, wherein the vehicle is dispatched by a ridesharing service.

16. The non-transitory computer readable medium of claim 9, wherein the instructions are further effective to cause the at least one processor to:
determine details about the point of interest to present; and
present at least a portion of the details about the point of interest, wherein an amount of details included in the portion is based at least in part on a speed of the vehicle.

17. A system comprising:
at least one processor; and
at least one memory storing computer-readable instructions that, when executed by the at least one processor, cause the at least one processor to:
modify a determined route to generate a modified route that includes a detour to a point of interest;
determine, based on sensor data received from one or more sensors of a vehicle, that the vehicle is within a threshold distance from the point of interest, wherein the sensor data indicates a position of the vehicle; and
adjust, when the vehicle is within the threshold distance from the point of interest, a speed and an acceleration of the vehicle to increase a period of time that the point of interest is visible.

18. The system of claim 17, wherein the computer-readable instructions, when executed by the at least one processor, further cause the at least one processor to:
prior to modifying the determined route to generate the modified route, determining that a potential sightline exists along the modified route to the point of interest, wherein modifying the determined route to generate the modified route is based on the potential sightline.

19. The system of claim 17, wherein the computer-readable instructions, when executed by the at least one processor, further cause the at least one processor to:
detect, using the one or more sensors of the vehicle, that the point of interest is obscured;
remove, from a display, details about the point of interest; and
project, onto a position on the display where the point of interest would be if the point of interest were not obscured, a virtual representation of the point of interest.

20. The system of claim 19, wherein the computer-readable instructions, when executed by the at least one processor, further cause the at least one processor to:
detect, using the one or more sensors of the vehicle, that the point of interest is no longer obscured; and
remove, from the display, the virtual representation of the point of interest.

* * * * *